United States Patent
Maloum

(10) Patent No.: US 9,724,996 B2
(45) Date of Patent: Aug. 8, 2017

(54) METHOD OF VERIFYING THE OPERATION OF A MOTOR PROPULSION PLANT FITTED TO AN AUTOMOTIVE VEHICLE AND CORRESPONDING SYSTEM

(71) Applicant: RENAULT S.A.S., Boulogne Billancourt (FR)

(72) Inventor: Abdelmalek Maloum, Chevilly la Rue (FR)

(73) Assignee: RENAULT s.a.s., Boulogne Billancourt (FR)

( * ) Notice: Subject to any disclaimer, the term of this patent is extended or adjusted under 35 U.S.C. 154(b) by 56 days.

(21) Appl. No.: 14/763,052

(22) PCT Filed: Apr. 29, 2014

(86) PCT No.: PCT/FR2014/051022
§ 371 (c)(1),
(2) Date: Jul. 23, 2015

(87) PCT Pub. No.: WO2014/177802
PCT Pub. Date: Nov. 6, 2014

(65) Prior Publication Data
US 2015/0352958 A1      Dec. 10, 2015

(30) Foreign Application Priority Data

May 3, 2013   (FR) ...................... 13 54080

(51) Int. Cl.
*B60L 3/12*       (2006.01)
*B60L 3/00*       (2006.01)
(Continued)

(52) U.S. Cl.
CPC .............. *B60L 3/12* (2013.01); *B60L 3/0038* (2013.01); *B60L 15/02* (2013.01); *B60L 15/025* (2013.01);
(Continued)

(58) Field of Classification Search
None
See application file for complete search history.

(56) References Cited

U.S. PATENT DOCUMENTS 5,047,699 A       9/1991   Rozman et al.
8,080,956 B2 *   12/2011   Wu ....................... B60L 11/123
                                                                    318/400.02
(Continued)

FOREIGN PATENT DOCUMENTS

JP          2001-268980 A       9/2001

OTHER PUBLICATIONS

International Search Report issued Sep. 5, 2014 in PCT/FR2014/051022 filed Apr. 29, 2014.
(Continued)

*Primary Examiner* — Mussa A Shaawat
*Assistant Examiner* — Abdhesh Jha
(74) *Attorney, Agent, or Firm* — Oblon, McClelland, Maier & Neustadt, L.L.P.

(57) ABSTRACT

A method and system for verifying operation of a motor propulsion plant fitted to an automotive vehicle with electric or hybrid traction, the motor propulsion plant including an electric motor including a permanent-magnet rotor. The method includes: a regulation of currents of a stator and a measurement of direct and quadratic components of the currents; an application, in a model of the electric motor linking control signals to the direct and quadratic components of the currents, of a change of variable in which X=Iq3+Id3, Y=Iq−Id; determination of minimum and maximum bounds for X and Y to deduce therefrom minimum and maximum bounds for Iq and Id; and a comparison between the measured direct and quadratic components of the currents and the minimum and maximum bounds for Iq and Id.

6 Claims, 1 Drawing Sheet

(51) Int. Cl.
*B60L 15/02* (2006.01)
*H02P 29/024* (2016.01)
*H02P 21/14* (2016.01)
*H02P 21/22* (2016.01)

(52) U.S. Cl.
CPC .............. *H02P 21/14* (2013.01); *H02P 21/22* (2016.02); *H02P 29/027* (2013.01); *Y02T 10/643* (2013.01); *Y02T 10/645* (2013.01); *Y10S 903/903* (2013.01)

(56) References Cited

U.S. PATENT DOCUMENTS

2002/0008492 A1    1/2002    Nagayama
2013/0077194 A1    3/2013    Hasan et al.

OTHER PUBLICATIONS

French Search Report issued Feb. 5, 2014 in FR 1354080 filed May 3, 2013.

\* cited by examiner

METHOD OF VERIFYING THE OPERATION OF A MOTOR PROPULSION PLANT FITTED TO AN AUTOMOTIVE VEHICLE AND CORRESPONDING SYSTEM

BACKGROUND

The invention relates to the verification of the operation of a power train with which a motor vehicle is equipped, and in particular the verification of the operation of the sensors embedded in the power train, and the power trains provided with permanent magnet machines.

In the motor vehicles with electric drive, the torque supplied by an electric motor has to be monitored. Since the torque of an electric machine is directly linked to the current flowing therein, these currents have to be controlled with precision.

In a synchronous machine, notably a three-phase permanent magnet synchronous machine with axial flux, the currents flowing in the three phases of the stator are sinusoidal and each phase-shifted by $$\frac{2\pi}{3} \text{rad.}$$

These currents create a revolving magnetic field in the electric machine. The rotor is made up of a permanent magnet, for example provided with five pairs of poles. Like a compass, the rotor is naturally aligned on the revolving magnetic field created by the stator. Thus, the rotation frequency of the rotor is equal to the frequency of the stator currents. It is the amplitudes of the stator currents and the power of the rotor magnets which create the torque necessary to the rotation of the machine. To control these currents, sinusoidal voltages each equally phase-shifted by $$\frac{2\pi}{3} \text{rad}$$

therefore have to be applied to each phase of the stator.

Generally, it is simpler to apply a regulation to constants than to sinusoidal signals. The Park transform is generally used to project a three-phase system onto a two-dimensional space to obtain an equivalent revolving reference frame. It is thus possible to transpose the three currents and the three sinusoidal voltages of the stator relative to the three phases of a three-phase system into a space where the sinusoidal signals are expressed in the form of constant signals (one component on the direct axis d and one component on the quadrature axis q). In the case of a synchronous machine, the Park reference frame is linked to the rotor.

By working with currents and voltages expressed in the Park space, it is thus possible to act on constant currents and voltages rather than on sinusoidal signals to regulate the three-phase machine to be controlled. By doing the inverse transform, it is possible to revert to the normal reference frame of the machine and therefore know exactly what voltages or what currents to apply to each phase of the machine.

Current sensors are generally used to implement a regulation of the torque. It is also possible for sensors suitable for measuring the torque to be used.

As will be understood, a failure of one of the sensors prevents the correct regulation of the torque which has to be supplied by the electric machine. It is therefore necessary to detect such a failure.

Reference will be able to be made to the document JP 2001268980 which describes an estimation of the current flowing in a direct current machine, but this solution is not suited to the machines that operate with sinusoidal currents.

The document U.S. Pat. No. 5,047,699 also describes an estimation of the current flowing in a direct current machine.

The document US 20020008492 describes a detection of the failure of sensors in which the variations of the measurements supplied by the sensors are monitored.

BRIEF SUMMARY

The aim of the invention is therefore to allow for a verification of the operation of an electric machine having a permanent magnet rotor, and which can be implemented in steady-state and dynamic regimes.

The subject of the invention, according to a first aspect, is therefore a method for verifying the operation of a power train with which a motor vehicle with electric or hybrid drive is equipped, the power train comprising an electric motor provided with a permanent magnet rotor and a stator, said method comprising a regulation of the stator currents delivering control signals to the electric motor, said currents to be regulated and said control signals being expressed in a revolving reference frame comprising a direct axis and a quadratic axis, and a measurement of the direct and quadratic components of the currents.

According to a general feature, the method comprises:

an application, in a model of the electric motor linking the control signals to the direct and quadratic components of the currents, of a change of variable by computation of new variables X and Y according to the relationships $X=I_q^3+I_d^3$ and $Y=I_q-I_d$, in which $I_d$ and $I_q$ respectively denote the direct component of the current and the quadratic component of the current, a determination of minimum and maximum bounds of the modified variables to deduce therefrom minimum and maximum bounds for the direct and quadratic components of the current, a comparison between the measured direct and quadratic components of the currents and said minimum and maximum bounds.

The model of the electric motor of a machine in which the rotor is a permanent magnet is a system which is not cooperative. By implementing the change of variable described above, a system is obtained which is cooperative, in other words, if the terms that appear in this system are bounded, then the same also applies to the variables X and Y of this system.

Thus, minimum and maximum values can be obtained for X and Y by bounding the terms which appear in the system, and the minimum and maximum bounds for $I_q$ and $I_d$ can be deduced therefrom.

If the result of the comparison indicates that the measured value is outside of these bounds, then it can be considered that one or more sensors are failing. It is then possible, for example, to limit the use of the electric motor. A more secure operation is therefore obtained.

The method can further comprise a measurement of the torque generated by the electric motor, for example by a torque meter, a computation of minimum and maximum bounds for the torque from the minimum and maximum bounds for the quadratic component of the current, and a comparison between the measured torque and said minimum and maximum bounds for the torque.

In such an electric machine, the torque is linked to the number of pairs of poles of the rotor, to the flux generated by the rotor magnets and to the quadratic component of the current. Minimum and maximum bounds for $I_q$ can therefore be deduced from the bounds for the torque.

The method can comprise a generation of at least one signal if one of the measured values is outside the determined bounds.

Another subject of the invention, according to a second aspect, is a system for verifying the operation of a power train with which a motor vehicle with electric or hybrid drive is equipped, the power train comprising an electric motor provided with a permanent magnet rotor and a stator, the vehicle comprising means configured to regulate the stator currents delivering control signals to the electric motor, said currents to be regulated and said control signals being expressed in a revolving reference frame comprising a direct axis and a quadratic axis, means configured to measure direct and quadratic components of the currents.

According to a general feature, the system comprises:
means configured to apply, in a model of the electric motor linking the control signals to the direct and quadratic components of the currents, a change of variable by computation of new variables X and Y according to the relationships $X=I_q^3+I_d^3$ and $Y=I_q-I_d$, in which $I_d$ and $I_q$ respectively denote the direct component of the current and the quadratic component of the current, means configured to determine minimum and maximum bounds for X and Y suitable for deducing minimum and maximum bounds for the direct and quadratic components of the current, means configured to compare the measured direct and quadratic components of the currents and said minimum and maximum bounds.

The system can further comprise means configured to compute minimum and maximum bounds for the torque from the minimum and maximum bounds for the quadratic component of the current, and means for comparing a torque measured by means for measuring the torque of the vehicle and said minimum and maximum bounds for the torque.

The system can comprise means configured to generate at least one signal if one of the measured values is outside the determined bounds.

BRIEF DESCRIPTION OF THE DRAWINGS

Other aims, features and advantages of the invention will become apparent on reading the following description, given purely as a nonlimiting example, and with reference to the attached drawings in which.

DETAILED DESCRIPTION

Figure 1:
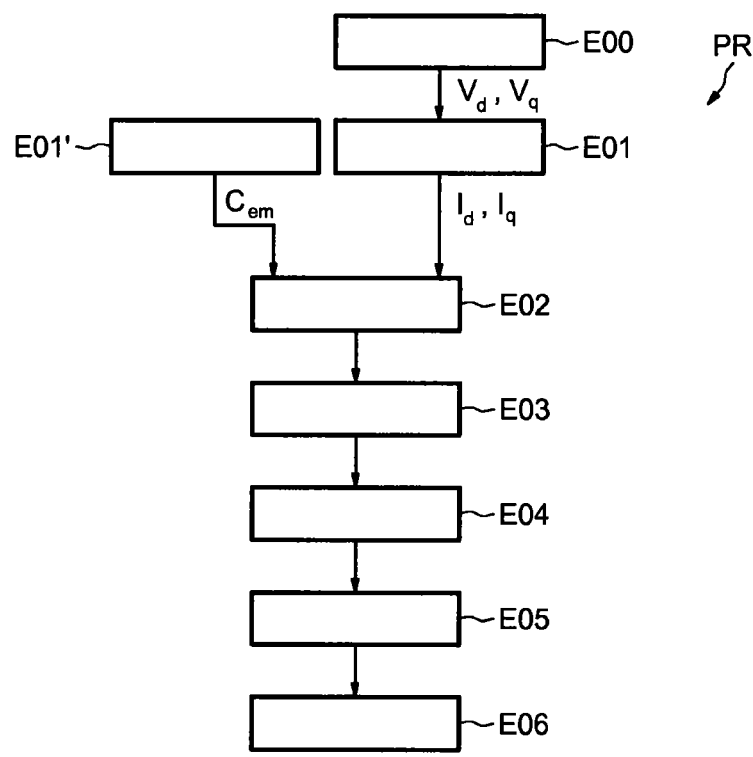
FIG. 1 schematically illustrates different steps of a method according to an implementation of the invention, and FIG. 2 schematically illustrates a system according to an embodiment of the invention.

FIG. 1 schematically shows the different steps of a method PR for verifying the operation of a power train with which a motor vehicle with electric or hybrid drive is equipped. The power train of this vehicle can comprise an electric motor provided with a permanent magnet rotor and a stator.

A first step E00 can be implemented in which the stator currents (or the torque) can be regulated to obtain control signals. These control signals can be expressed in the Park space and, for example, denoted $V_d$ (component on the direct axis) and $V_q$ (component on the quadrature axis). This regulation can be implemented by conventional means, for example by using a proportional-integral corrector or a proportional-integral-derivative corrector.

The method can also comprise a measurement of the direct and quadratic components of the currents denoted $I_d$ (direct component) and $I_q$ (quadratic component) in the step E01. The step E01 can, as a variant, be implemented later in the method to implement a comparison with determined bounds.

Concurrently with the step E01, a step E01' can be implemented for measuring the torque denoted $C_{em}$.

A step E02 can then be implemented for generating a model of the electric motor linking the control signals to the direct and quadratic components of the currents. As a variant, the step E02 is implemented previously and the same model is used each time the method is implemented.

It should be noted that, in the Park space, such a model corresponds to the following system of equations:

$$\begin{cases} V_d = R_s I_d + L_d \dot{I}_d - \omega_r L_q I_q \\ V_d = R_s I_q + L_q \dot{I}_q - \omega_r (L_d I_d + \phi_f) \end{cases} \quad (EQ\ 1)$$

With $R_s$ being the equivalent resistance of the stator of the machine, $L_d$ and $L_q$ being the inductances on each axis, respectively direct and in quadrature, of the Park plane of the machine, $\omega_r$ being the rotation speed of the magnetic field of the machine (i.e. the rotation speed of the rotor multiplied by the number of pairs of poles of the machine denoted p), and $\phi_f$ being the flux generated by the rotor magnets.

It should also be noted that the system of equations EQ1 is not cooperative. Also, for a machine in which $L_d$ and $L_q$ are equal, the following electromagnetic torque value $C_{em}$ is obtained:

$$C_{em} = p \Phi_f I_q \quad (EQ2)$$

With p being the number of pairs of poles of the machine, and $\Phi_f$ being the flux generated by the rotor magnets.

In order to make the system of equations EQ1 cooperative, the variable changing step E03 can be implemented. In this step, the new variables can be denoted X and Y, with $X=I_q^3+I_d^3$ and $Y=I_q-I_d$. If $U_x$ and $U_y$ are used to denote the new control signals applied as input for the system, the following system of equations is obtained:

$$\begin{cases} \dfrac{3}{L_s} U_x = \dfrac{3}{L_s}(I_d^2 V_d + I_q^2 V_q) = \dfrac{3R_s}{L_s} X + \dot{X} + 3\omega_r I_q \left[ I_d(I_q - I_d) + \dfrac{\Phi_f}{L_s} \right] \\ \dfrac{1}{L_s} U_y = \dfrac{1}{L_s}(-V_d + V_q) = \dfrac{R_s}{L_s} Y + \dot{Y} + \omega_r \left[ I_d + I_q + \dfrac{\Phi_f}{L_s} \right] \end{cases} \quad (EQ\ 3)$$

With $L_s$ being the inductance on each axis q and d of the machine.

This change of variable is implemented by deriving the expressions of X and Y to replace the values of $I_q$ and $I_d$ or their derivatives obtained by the system of equations EQ1.

It can be noted that a cooperative system is obtained. Because of this, if min is used to denote the minimum bounds and max to denote the maximum bounds, and $X^+$ and $X^-$ to denote the respectively maximum and minimum bounds for X and $Y^+$ and $Y^-$ to denote the respectively maximum and minimum bounds for Y, the following system is obtained in a step E04:

$$\begin{cases} \min\left(\frac{3}{L_s}U_x\right) = \min\left(\frac{3R_s}{L_s}\right)X^- + \dot{X}^- + 3\omega_r I_q I_d (I_q - I_d) + \min\left(3\omega_r I_q \frac{\Phi_f}{L_s}\right) \\ \min\left(\frac{1}{L_s}U_y\right) = \min\left(\frac{R_s}{L_s}\right)Y^- + \dot{Y}^- + \omega_r (I_d + I_q) + \min\left(\omega_r \frac{\Phi_f}{L_s}\right) \\ \max\left(\frac{3}{L_s}U_x\right) = \max\left(\frac{3R_s}{L_s}\right)X^+ + \dot{X}^+ + 3\omega_r I_q I_d (I_q - I_d) + \max\left(3\omega_r I_q \frac{\Phi_f}{L_s}\right) \\ \max\left(\frac{1}{L_s}U_y\right) = \max\left(\frac{R_s}{L_s}\right)Y^+ + \dot{Y}^+ + \omega_r (I_d + I_q) + \max\left(\omega_r \frac{\Phi_f}{L_s}\right) \end{cases}$$ (EQ 4)

It should be noted that $\min(3/L_s * U_x) = \max(3/L_s) * U_x$ if $U_x$ is negative, or $\min(3/L_s) * U_x$ if $U_x$ is positive.

At each instant t after the initial instant $t_0$, it is known that the measured values of X and Y (obtained from measurements of $I_d$ and $I_q$) verify the following two equations:

$$\begin{cases} X^-(t) \le X(t) \le X^+(t) \\ Y^-(t) \le Y(t) \le Y^+(t) \end{cases}$$ (EQ 5)

Also, it should be noted that, in preliminary calibration steps, the minimum and maximum bounds of Rs, Ls, $\omega_r$ and $\phi_f$ can be determined. It is therefore possible to deduce the values of $X^+$, $X^-$, $Y^+$ and $Y^-$ from the system EQ4.

It is also possible to obtain the values of the maximum bounds ($I_d^+$ and $I_q^+$) and minimum bounds ($I_d^-$ and $I_q^-$) by solving the following system:

$$\begin{cases} X^- = (I_q^-)^3 + (I_d^-)^3 \\ Y^- = I_q^- - I_q^+ \\ X^+ = (I_q^+)^3 + (I_d^+)^3 \\ Y^+ = I_q^+ - I_q^- \end{cases}$$ (EQ 6)

Also, with the formula of the equation EQ2, it is possible to obtain minimum and maximum bounds for the torque $C_{em}$.

The step E05 can then be implemented, in which the values measured previously in the steps E01 and E01' are compared to the bounds obtained in the step E04.

If it is concluded that one of the measurements is outside of the bounds corresponding to this measurement, a step E06 can be implemented to generate signals indicating the failure of the sensor.

Figure 2:
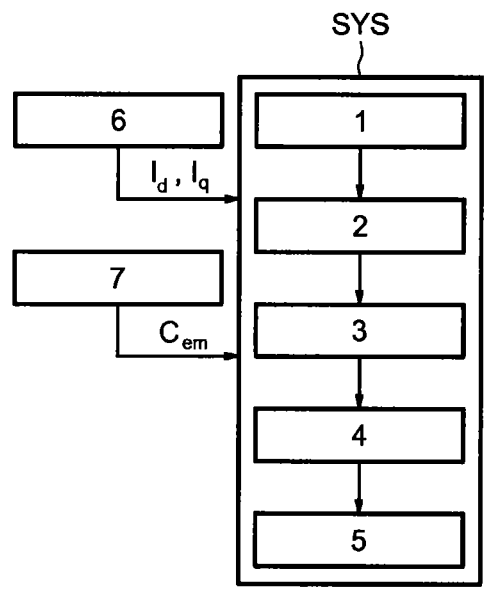

FIG. 2 shows a system SYS, for example embedded in a motor vehicle with electric or hybrid drive provided with a power train having a permanent magnet rotor.

The system SYS can be incorporated in an electronic control unit of the vehicle or in other types of computers embedded in a vehicle. Also, the vehicle can comprise other means not represented in FIG. 2 but which communicates with the system SYS, for example means configured to regulate stator currents delivering control signals to the electric motor.

The system SYS comprises means 1 configured to generate a model of the electric motor linking the control signals to the direct and quadratic components of the currents. The means 1 are configured to implement the step E02 described with reference to FIG. 1. As a variant, the system SYS does not comprise any means configured to generate a model of the electric motor linking the control signals to the direct and quadratic components of the currents, such a model having been generated previously.

The system SYS also comprises means 2 configured to apply, in said model, a change of variable in which $X = I_q^3 + I_d^3$, $Y = I_q - I_d$. In other words, the means 2 are configured to implement the step E03.

The system SYS also comprises means 3 configured to determine minimum and maximum bounds for X and Y suitable for deducing minimum and maximum bounds for $I_q$ and $I_d$ (step E04) and means 4 configured to compare the measured direct and quadratic components of the currents and said minimum and maximum bounds for $I_q$ and $I_d$ (step E05).

Preferentially, the system SYS comprises means 5 configured to generate at least one signal if one of the measured values is outside the determined bounds (step E06).

The vehicle can also comprise means 6 for measuring, or sensors for sensing, the currents Id and Iq, and also means 7 for measuring the torque. The system SYS and the method PR make it possible to determine whether these sensors are operating.

By virtue of the invention, it is possible to determine whether current sensors operate in any type of regime, dynamic or permanent. It is thus possible to limit the use of the electric motor.

The invention claimed is:

1. A method for verifying operation of a power train with which a motor vehicle with electric or hybrid drive is equipped, the power train including an electric motor including a permanent magnet rotor and a stator, the method comprising:
   regulating, via an electronic control unit, stator currents delivering control signals to the electric motor, the currents to be regulated and the control signals being expressed in a revolving reference frame including a direct axis and a quadratic axis;
   measuring, via the electronic control unit, the direct and quadratic components of the currents:
   applying, via the electronic control unit, in a model of the electric motor linking the control signals to the direct and quadratic components of the currents, a change of variable by computation of new variables X and Y according to relationships $X = I_q^3 + I_d^3$ and $Y = I_q - I_d$, in which $I_d$ and $I_q$ respectively denote the direct component of the current and the quadratic component of the current;
   determining, via the electronic control unit, minimum and maximum bounds of the changed variables to deduce therefrom minimum and maximum bounds for the direct and quadratic components of the current;
   comparing, via the electronic control unit, between the measured direct and quadratic components the currents and the minimum and maximum bounds; and
   limiting, via the electronic control unit, use of the electric motor when one of the measured values is outside the determined bounds.

2. The method as claimed in claim 1, further comprising:
   measuring torque generated by the electric motor;
   computing minimum and maximum bounds for the torque from the minimum and maximum bounds for the quadratic component of the current; and
   comparing between the measured torque and the minimum and maximum bounds for the torque.

3. The method as claimed in claim 1, further comprising generating at least one signal if one of the measured values is outside the determined bounds.

4. A system for verifying operation of a power train with which a motor vehicle with electric or hybrid drive is equipped, the power train including an electric motor including a permanent magnet rotor and a stator, the vehicle including means configured to regulate stator currents delivering control signals to the electric motor, the currents to be regulated and the control signals being expressed in a revolving reference frame including a direct axis and a quadratic axis, and means configured to measure direct and quadratic components of the currents, the system comprising:

an electronic control unit that is configured to apply, in a model of the electric motor linking the control signals to the direct and quadratic components of the currents, a change of variable by computation of new variables X and Y according to relationships $X=I_q^3+I_d^3$ and $Y=I_q-I_d$, in which $I_d$ and $I_q$ respectively denote the direct component of the current and the quadratic component of the current;

determine minimum and maximum bounds for X and Y for deducing minimum and maximum bounds for the direct and quadratic components of the current;

compare the measured direct and quadratic components of the currents and the minimum and maximum bounds; and limit use of the electric motor when one of the measured values is outside the determined bounds.

5. The system as claimed in claim 4, further comprising:

means configured to compute minimum and maximum bounds for torque from the minimum and maximum bounds for the quadratic component of the current; and means for comparing a torque measured by means for measuring the torque of the vehicle and the minimum and maximum bounds for the torque.

6. The system as claimed in claim 4, further comprising means configured to generate at least one signal if one of the measured values is outside the determined bounds.

\* \* \* \* \*